United States Patent [19]

Ataka et al.

[11] 4,426,211
[45] Jan. 17, 1984

[54] VACUUM CLEANER WITH DUST DISPOSAL

[75] Inventors: Yasukazu Ataka, Ibaraki; Katuzi Ikezaki, Sakai; Katsuhiko Umeda, Kashihara, all of Japan

[73] Assignee: Sharp Kabushiki Kaisha, Osaka, Japan

[21] Appl. No.: 331,330

[22] Filed: Dec. 16, 1981

[30] Foreign Application Priority Data

Dec. 19, 1980 [JP] Japan .................. 55-184359[U]
Jan. 9, 1981 [JP] Japan .................. 56-2478[U]
Jan. 20, 1981 [JP] Japan .................. 56-7110[U]
Jan. 20, 1981 [JP] Japan .................. 56-7111[U]

[51] Int. Cl.$^3$ .................................................. B01D 46/12
[52] U.S. Cl. .................................. 55/296; 15/327 E; 15/352; 55/357; 55/429; 55/433; 55/472; 55/482; 55/487; 55/DIG. 3
[58] Field of Search ................. 55/429, 433, 482, 472, 55/DIG. 3, 366, 296, 357, 487; 15/327 E, 347, 352

[56] References Cited

U.S. PATENT DOCUMENTS

| | | | |
|---|---|---|---|
| 2,226,630 | 12/1940 | McCord | 55/429 X |
| 2,643,733 | 6/1953 | Shellman | 55/429 X |
| 3,621,640 | 11/1971 | Ohno et al. | 55/472 X |
| 3,816,983 | 6/1974 | Sawada et al. | 55/429 X |
| 4,111,670 | 9/1978 | DeMarco | 55/433 X |

FOREIGN PATENT DOCUMENTS

| | | | |
|---|---|---|---|
| 53-85961 | 7/1978 | Japan | 15/347 |
| 54-3375 | 1/1979 | Japan | 55/472 |
| 54-99355 | 8/1979 | Japan | 55/DIG. 3 |

*Primary Examiner*—Kathleen J. Prunner
*Attorney, Agent, or Firm*—Birch, Stewart, Kolasch & Birch

[57] ABSTRACT

According to the present invention, there is provided a vacuum cleaner which comprises a dust collector detachably installed in a main body of the cleaner. A primary filter composed of a horizontal wall and a vertical wall is disposed within the dust collector. Both the horizontal and vertical walls are permeable to air and include a dust filter. A secondary filter is disposed behind the vertical wall of the primary filter. A first path for dust is defined btween the horizontal wall of the primary filter and the bottom of the body and merged into a second path developed between the vertical wall of the primary filter and the second filter. Preferably, the horizontal and vertical walls of the primary filter include a coarse mesh for trapping relatively large dust and the secondary filter includes a fine mesh for trapping relatively small dust which has passed through the primary filter. A lid is provided on the side of the primary filter opposite the vertical wall for discharging dust accumulated on said primary and secondary filters.

9 Claims, 6 Drawing Figures

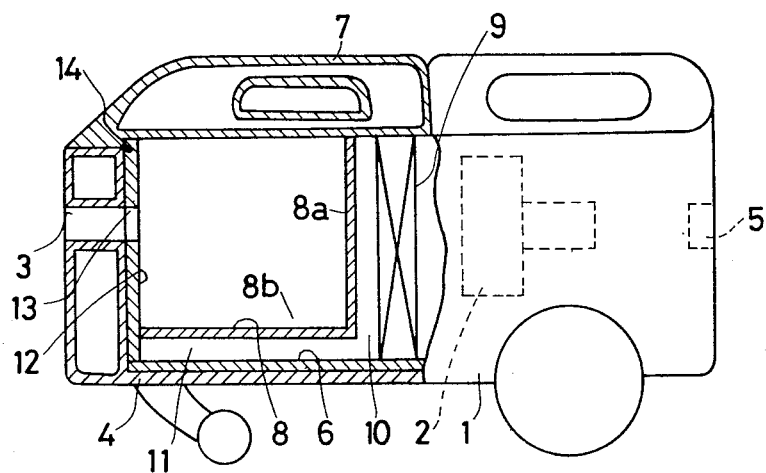
FIG. 1
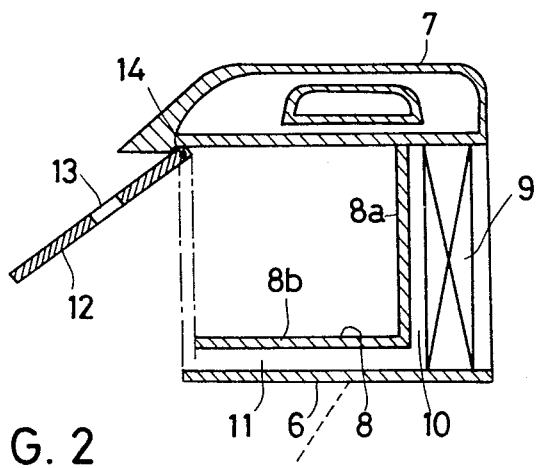
FIG. 2
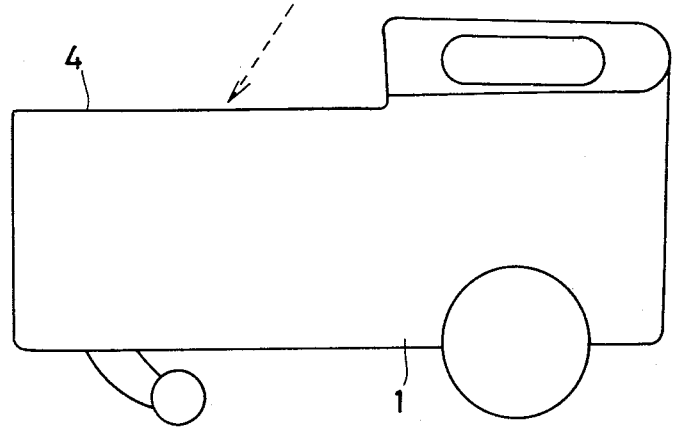

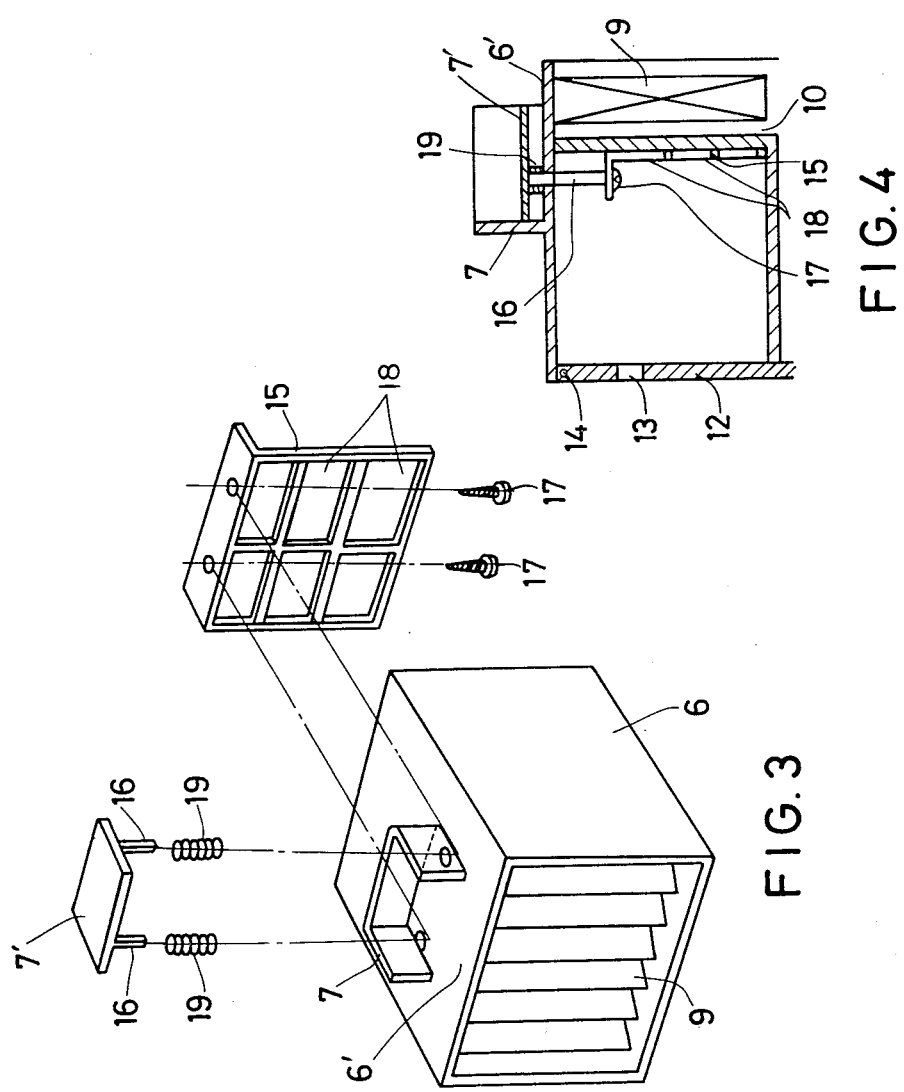

VACUUM CLEANER WITH DUST DISPOSAL

BACKGROUND OF THE INVENTION

This invention relates to a vacuum cleaner which provides a simple and clean way to dispose dust collected therein and enrich efficiency of dust removal without the need to soil the user's hands with dust.

A conventional way to dispose of dust collected in a vacuum cleaner involves detaching a dust collector from the main body of the cleaner, removing a primary filter out of the dust collector and discarding the dust accumulated between the primary and secondary filters from the collector. Therefore, the housekeeper must handle the filter with her/his hands in disposing dust and her/his hands become soiled and unwholesome. Because the primary filter consists of only a vertical wall perpendicular to the dust path, it is small in effective area for suction of dust and has the disadvantage that the filter relatively quickly accumulates with dust or other foreign substances.

OBJECT AND SUMMARY OF THE INVENTION

Accordingly, it is an object of the present invention to provide a vacuum cleaner which has a device for disposing of dust in a simple and clean manner for increasing the efficiency of dust removal.

It is another object of the present invention to provide a vacuum cleaner which enables the user to handle a filter and discard dust without soiling her hands.

It is still another object of the present invention to provide a vacuum cleaner which permits dust accumulated in a dust collector to easily be discharged from the dust collector.

According to the present invention, the above objects are achieved by providing a vacuum cleaner which comprises a dust collector detachably installed in a main body of the cleaner. A primary filter composed of a horizontal wall and a vertical wall is disposed within the dust collector. Both the horizontal and vertical walls are permeable to air and include a dust filter. A secondary filter is provided disposed behind said vertical wall of said primary filter. A first path for dust is defined between the horizontal wall of the primary filter and the bottom of the body and merged into a second path developed between the vertical wall of the primary filter and the second filter. Preferably, the horizontal and vertical walls of the primary filter include a coarse mesh for trapping relatively large dust and the secondary filter includes a fine mesh for trapping relatively small dust which has passed through said primary filter. A lid is provided on the side of the primary filter opposite the vertical wall for discharging dust accumulated on said primary and secondary filters.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 1 is a schematic cross-sectional side view of a vacuum cleaner constructed according to the present invention;

FIG. 2 is a view showing the cleaner with a dust collector as shown in FIG. 1 removed from the main body thereof;

FIG. 3 is an exploded perspective view of a dust collector according to another embodiment of the present invention;

FIG. 4 is a cross-sectional view of the dust collector as illustrated in FIG. 3;

DETAILED DESCRIPTION OF THE INVENTION

Figure 5:
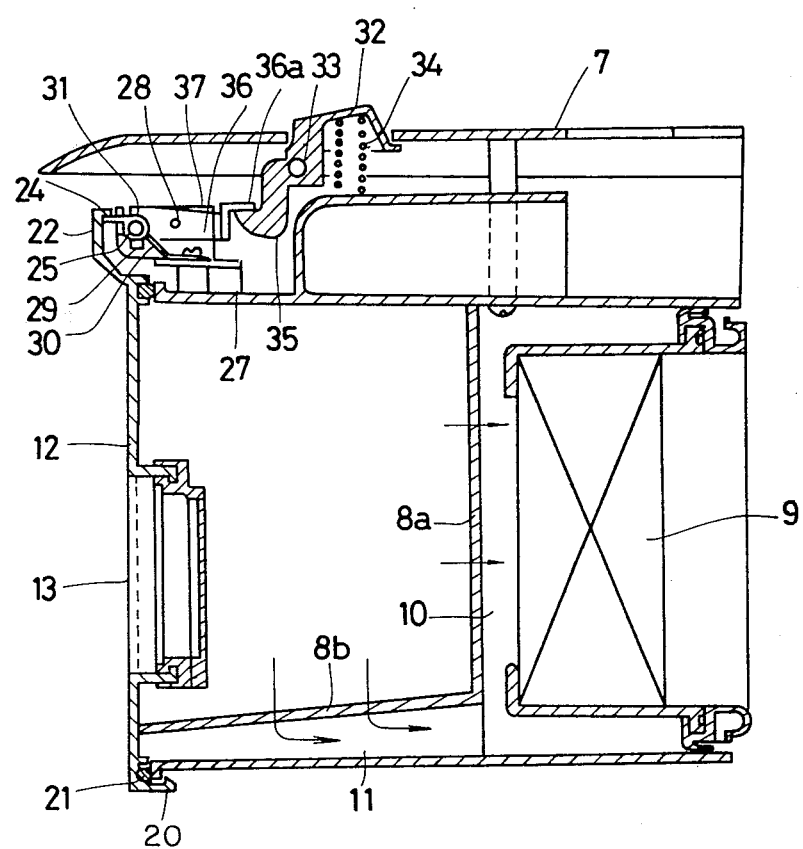
FIG. 5 is a cross-sectional view showing a lid assembly in further detail.

Referring first to FIG. 1, there is illustrated a vacuum cleaner containing in a main body 1 an electric blower unit or fan 2, an air inlet 3, a concave chamber 4 and an air outlet 5. A dust collector 6 with a handle 7 is installed detachably within the chamber 4 from the top of the cleaner main body 1. The dust collector 6 includes a housing having a top, bottom and two side walls.

A primary filter 8 is of a reversed "L" shape consisting of a vertical wall 8a and a horizontal wall 8b and includes a coarse mesh for collection of relatively large dust. The primary filter 8 is seated in a backward position in the dust collector 6. Preferably, the primary filter 8 may be set up by a plastic molding which includes as a unitary unit the two walls and the mesh. Disposed at a distance 10 behind the vertical wall 8a of the primary filter 8 is a secondary filter 9 for collection of relatively small dust. The secondary filter 9 forms an air permeable end closure for the dust collector 6. There is defined between the horizontal wall 8b of the primary filter 8 and the bottom of the dust collector 6 a first path 11 for guiding dust. The path 11 is merged, at its rear end, into and communicated with the second path 10 between the vertical wall 8a and the secondary filter 9. The secondary filter 9 includes a fine mesh of a dimension smaller than that of the primary for catching relatively small dust which has passed through the primary filter. The secondary filter 9 may be constructed of a plurality of paper filtering segments with each having the fine mesh permeable to air. A dust-disposal lid 12 has an opening 13 aligning with the air inlet 3 with the top end thereof being pivoted about the handle 7 by way of a hinge 14 and the remaining end being in engaging relationship with the primary filter 8 so as to close the front of the dust chamber 6.

When the blower unit or fan 2 is driven and air together with dust is drawn via the air inlet 3, the dust ladden air is admitted via the opening 13 into the dust collector 6, so that relatively large dust is trapped in a dust collection chamber defined by both the vertical and horizontal walls 8a and 8b of the primary filter 8 and the remaining or relatively small dust traverses the primary filter 8 and is trapped by the secondary filter 9. Only the dust-free air travels across the blower unit 2 and leaves via the air outlet 5.

Since the primary filter 8 is of the reversed "L" shape and both the vertical and horizontal walls 8a and 8b are permeable to air, the effective suction area of the filter is twice as large as that of the conventional filter to thereby reduce correspondingly the possibility of filling up the filter with dust or other foreign substances. It seems that the vertical wall 8a is first filled up with dust or other substances because of its major flow of the dust-ladden air through the vertical wall 8a and the secondary filter 9 and the horizontal wall then becomes more effective as a device for filtering the dust.

The dust collected in the dust collector may be thrown away in the following way. Relatively small dust drops off upon applying mechanical oscillation or the like to the secondary filter 9. Then, the user lifts the dust collector 6 out of the chamber 4, with the handle 7 being gripped, and carries to a desired site as it is. After the lid 12 is placed into the open position, the dust accumulated between the lid 12 and the primary filter 8 is discarded outward. Since the dust accumulated is relatively large in size, it may be easily thrown away from the front of the dust collector 6 merely by inclining the front side of the dust collector 6. The relatively small or fine dust trapped in between the primary filter 8 and the secondary filter 9, on the other hand, may be discarded together with the relatively large dust through the path 11 between the primary filter 8 and the collector 6.

FIGS. 3 and 4 show another embodiment of the present invention, wherein there is provide a slide 15 as an aid for removing dust tightly and persistently attached on the primary filter 8 and especially the vertical wall thereof. A handle 7 is attached to the top wall 6' of the dust collector 6. A reciprocating device for imparting motion to the slide 15 is provided by a top plate 7' of the handle 7, standing studs 16 and compression springs 19. Plate 7' is operatively coupled with the slide 15 by the standing studs 16 which are fixedly secured on the top plate 7' by screws 17 or the like. The slide 15 having a plurality of windows 18 is movable in a vertical direction so that it may strip off the dust attached on the vertical wall 8a of the primary filter 8. Compression springs 19 disposed around the standing studs 16 normally lift the slide 15 so as to define a space between the top plate 7' and the top of the dust collector 6 for allowing insertion of the user's fingers under normal operating conditions.

Figure 6:
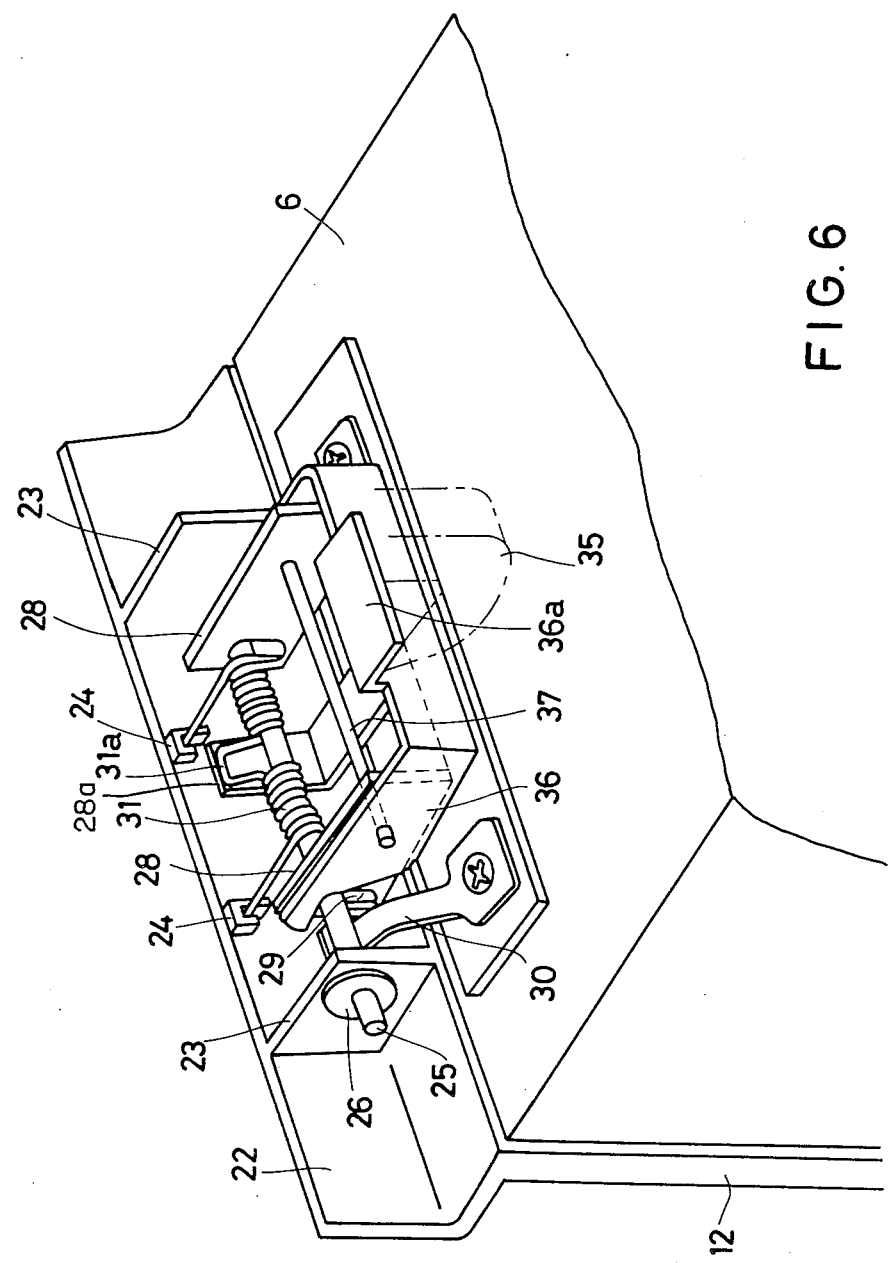
FIG. 6 is a fragmentary perspective view of the lid assembly as shown in FIG. 5.

FIGS. 5 and 6 show details of the lid opening assembly wherein the lid 12 has on its fringe a packing seal 21, at its lowest end a hook 20 engageable with a downwardly oriented edge of the dust collector 6 and at its highest end an "L" shaped bend 22 and spaced-apart shaft supports 23. A vertical segment of the bend 22 is provided with stops 24 intermediate the two supports 23. A shaft 25 is disposed to rotatably extend between the two supports by means of a speed nut 26 or other fittings. Furthermore, the shaft 25 is movable in a vertical direction in elongated slots 29 in wings 28 extending from a mounting 27 positioned on the top of the dust collector 6 toward the "L" shaped bend 22. A leaf spring 30 is seated on the top of the dust collector 6 together with the above mentioned mounting 27 with its free end being held in engaging relationship so as to bias upwardly the shaft 25 (that is, the lid 12). A coil spring 31 is disposed around the shaft 25 to give the lid 12 a force of rotation, with its one end 31a engaging with a free end 28a of the wings 28 and its remaining ends engaging with the stops 24. The force of rotation around the shaft 25 as generated from the force of the coil spring 31 and the force of lift as generated from the force of the leaf spring 30 are always exerted on the lid 12, so that the lid 12 moves downwardly and the hook 20 disengages from the bottom edge of the dust collector 6 when the shaft 25 is depressed downwardly along the elongated slots 29 against the force of the leaf spring 30. The result is that the lid 12 is rotated clockwise around the shaft 25 and moved out of the front opening of the dust collector under the influence of the coil spring 31. To place the lid 12 into a closed position, the lid 12 is manually rotated counterclockwise so that the hook 20 engages into the bottom edge of the dust collector 6. Upon further counterclockwise rotation of the lid 12 the lid 12 moves somewhat downwardly due to the movement of the hook sliding over the bottom edge and the hook 20 itself shifts into the locked position.

An actuator button 32 is rotatable secured around a pin 33 to unlock the lid 12 and normally extends beyond the top plate 7' of the handle 7 under the influence of a spring 34. The actuator button 32 includes at its lower portion an integral pawl 35 which is engageable with a tongue 36a of an actuator lever 36. The actuator lever 36 is rotatable secured around a rod 37 extending between the wings 28 and includes a free end engaging with the shaft 25 in such a direction as to hoist the shaft 25. In other words, when the actuator button 32 is depressed against the force of the spring 34, the pawl 35 moves upwardly, permitting the actuator lever 36 to rotate counterclockwise and move the shaft 25 downwardly with its tip. This arrangement facilitates the opening and closing movement of the lid and the removal of dust out of the dust collector.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A detachable dust collector for use with a vacuum cleaner having a main body including an inlet opening and an outlet opening with an electric fan being operatively positioned therebetween, said dust collector comprising:

a housing having a top, bottom and two side walls adapted to be removably disposed within said main body and operatively positioned between said inlet opening and said electric fan;

primary filter means for trapping dust and objects of a predetermined size being operatively positioned within said housing;

said primary filter means including a horizontal wall extending from one side wall to the other side wall and a vertical wall being spaced from said bottom wall of said housing and extending from said top wall to said horizontal wall to define a dust collection chamber adapted to be in communication with said inlet opening and a first path being positioned between said horizontal wall of said primary filter means, said two side walls and said bottom wall of said housing;

secondary filter means for trapping dust and objects of a predetermined size being operatively positioned within said housing downstream of said primary filter means, said secondary filter means being spaced from said vertical wall to define a second path being in communication with said first path;

said secondary filter means extending between said top, bottom and both side walls of said housing to form an air permeable end closure for said housing; and a movable lid being operatively positioned on an open front of said housing and being hinged about said top wall for forming a closure thereto, said lid including an opening adapted to be in communication with said inlet opening and said dust collection chamber and said lid being in engagement with said horizontal wall of said primary filter means and said bottom wall for closing the front of said dust collection chamber and said first path;

wherein detaching said dust collector from said vacuum cleaner and moving said lid to an open position permits dust and objects to be discharged in a single tilting action from said dust collection chamber of said primary filter means and from said first and second paths being in communication with said secondary filter means.

2. A detachable dust collector as set forth in claim 1 wherein the horizontal and vertical walls of the primary filter means include a coarse mesh for catching relatively large dust and the secondary filter means includes a fine mesh for catching relatively small dust which has passed through said primary filter means.

3. A detachable dust collector according to claim 1, wherein said housing includes a handle for aiding in the removal and emptying of said dust collector.

4. A detachable dust collector according to claim 1, and further including a slide operatively positioned adjacent to said vertical wall of said primary filter means and reciprocating means for imparting motion to said slide for dislodging dust particles accumulated on said vertical wall of said primary filter means.

5. A detachable dust collector according to claim 4, wherein said reciprocating means includes a top plate, standing studs affixed thereto and spring means, said standing studs projecting through said top wall and being affixed to said slide, said spring means being operatively positioned between said top plate and said top wall of said housing, wherein imparting a manual force to said top plate reciprocates said slide relative to said vertical wall and said spring means returning said slide to a first position when said manual force is released.

6. A detachable dust collector according to claim 1, wherein said lid further includes a hook disposed adjacent a lower end thereof for retaining said lid on said bottom wall of said housing.

7. A detachable dust collector according to claim 1, further including a shaft and at least one leaf spring, said leaf spring being affixed at one end to the top wall of said housing, said shaft being operatively positioned on the other end of said leaf spring, said lid being rotatably mounted to said shaft and said lid and shaft being positioned on said leaf spring for limited vertical movement.

8. A detachable dust collector according to claim 7, and further including a coil spring disposed around said shaft and operatively positioned between said lid and said top wall for closing said lid relative to said housing.

9. A detachable dust collector according to claim 8, and further including an actuator means operatively connected to said lid and said top wall of said housing for selectively permitting said lid to be opened relative to said housing.

* * * * *